United States Patent [19]

Schnizler, Jr.

[11] 4,127,923
[45] Dec. 5, 1978

[54] DEVICE FOR RELEASABLY SECURING AN AUXILIARY TOOL TO A MANUALLY HELD POWER DRILL

[75] Inventor: Albrecht Schnizler, Jr., Nürtingen, Germany

[73] Assignee: Metabowerke KG Closs, Rauch & Schnizler, Nürtingen, Germany

[21] Appl. No.: 586,405

[22] Filed: Jun. 12, 1975

[30] Foreign Application Priority Data

Jun. 14, 1974 [DE] Fed. Rep. of Germany ....... 2428610

[51] Int. Cl.$^2$ ............................................. B65D 63/00
[52] U.S. Cl. ................................................. 24/270
[58] Field of Search ................. 24/270, 274, 279, 280, 24/281, 282, 285; 285/420; 51/170 R; 408/20, 241 R; 64/3, 4

[56] References Cited

U.S. PATENT DOCUMENTS

| | | | |
|---|---|---|---|
| 1,699,870 | 1/1929 | Black et al. | 173/29 |
| 2,482,374 | 9/1949 | Ruschmeyer | 24/280 |
| 2,689,141 | 9/1954 | Kiekhaefer | 24/279 |
| 2,832,446 | 4/1958 | Smith et al. | 24/279 |
| 2,990,599 | 7/1961 | Gustavsson | 24/279 |
| 3,157,932 | 11/1964 | Kyrias | 24/279 |
| 3,174,365 | 3/1965 | Lucarelli | 408/241 |
| 3,441,655 | 4/1969 | Turner | 285/260 |
| 3,586,354 | 6/1971 | Boscacci | 285/420 |

FOREIGN PATENT DOCUMENTS 922205  1/1947  France ................................. 408/241

Primary Examiner—Doris L. Troutman
Attorney, Agent, or Firm—Michael J. Striker

[57] ABSTRACT

The spindle neck of a manually held power drill is to be releasably secured in a slotted sleeve of an auxiliary tool unit. For this purpose a tensioning band is provided which surrounds the sleeve and tensions the same about the spindle neck, and a manually operable tensioning-lever arrangement is provided which requires no use of tools and which serves for rapidly engaging and disengaging the tensioning band.

13 Claims, 2 Drawing Figures ns before the desired tensioning is obtained. This is time consuming, and necessitates the use of at least simple tools such as a screwdriver, and at times may be quite frustrating for the inexperienced do it yourself home worker who is the person most likely to employ these power tool combinations.

DEVICE FOR RELEASABLY SECURING AN AUXILIARY TOOL TO A MANUALLY HELD POWER DRILL

BACKGROUND OF THE INVENTION

The present invention relates to a tensioning arrangement, and more particularly to a device for releasably securing the spindle neck of a manually held power drill in a slotted sleeve of an auxiliary tool unit.

The versatility of the widely owned hand-held electric drills has been vastly increased in recent years by providing auxiliary tool units, such as circular saws, sanders, power planes, routers and the like, which can be connected with the power drill that serves as the power source for them and serves to drive them. As a general rule, this connection which must of course be releasable, is effected by inserting the spindle neck of the power drill into a slotted sleeve of the auxiliary tool unit, and thereupon tensioning the sleeve against the spindle neck to connect the tool by friction. For this purpose there is provided at each side of the axial slot in the sleeve of the auxiliary tool unit an eyelet which receives a tensioning screw that acts in direction tangentially of the slotted sleeve so that, when the screw is tightened, it draws the two eyelets together and tends to decrease the width of the slot, thus pulling the sleeve tightly against the spindle neck of the power drill.

This arrangement is satisfactory if the housing and sleeve of the auxiliary tool unit are made of metallic material. There is, however, a recent trend towards manufacturing the housing and sleeve of synthetic plastic material, usually thermoplastic material. It has now been found that if thermoplastic materials are used, the previously satisfactory manner of connecting the slotted sleeve of the auxiliary tool unit to the spindle neck of the power drill is no longer properly usable. The reason for this is that thermoplastic material when subjected to the tensioning stresses necessary to push the sleeve against the spindle neck of the drill, tends to flow or yield sufficiently so that the mechanical tension becomes decreased to the point where the drill and the auxiliary tool unit are no longer connected with one another reliably enough to provide a proper transmission of power and to eliminate the possibility of hazards due to undesired and accidental disconnection. Thus far the prior art has proposed to surround the slotted sleeve with a tension band analogous to a conventional hose clamp which has two end portions formed with the respective eyelets and through which the tensioning screw extends. The eyelets are therefore no longer present in the material of the slotted sleeve itself, and the difficulties encountered in proper tensioning where the slotted sleeve was of synthetic plastic material, have been overcome.

However, where the slotted sleeve is of synthetic plastic material, even this arrangement does not overcome all problems. The tensioning of the band is relatively difficult because the screw must be turned through quite a substantial distance before sufficient tension is exerted by the band upon the slotted sleeve. It is well known, of course, that a slotted sleeve of synthetic plastic material will yield more substantially than a similar sleeve of metallic material. Also, the angled ends of the tensioning band itself, in which the eyelets for the screw are formed, tend to yield as the screw is being tightened and all of this results in the necessity for the screw to be turned through quite substantial dis-

SUMMARY OF THE INVENTION

Accordingly, it is a general object of this invention to overcome the aforementioned disadvantages of the prior art.

More particularly, it is an object of this invention to provide an improved device for releasably securing the spindle neck of a manually held power drill in a slotted sleeve of an auxiliary tool unit, which can be readily engaged and disengaged without requiring the use of any tools for this purpose.

In keeping with these objects, and with others which will become apparent hereafter, one feature of the invention resides, briefly stated, in a device for releasably securing the spindle neck of a manually held power drill in a slotted sleeve of an auxiliary power tool unit, which device comprises tensioning means for tensioning the sleeve about the spindle neck, and toollessly manually operable means for rapidly engaging and disengaging the tensioning means.

According to a currently preferred embodiment the tensioning means which is in form of a tensioning band, may be so constructed that the effective length of the tensioning band can be readily varied independently of the operation of the manually operable means for engaging and disengaging the tensioning means.

The manually operable means itself may be in the form of a hand lever one end of which is articulated to one end of the tensioning band whereas the other end of the hand lever is to be gripped by the hand of a user. Intermediate these two ends of the hand lever there is at least one lug that is articulated to the hand lever and which is connected with the other end of the tensioning band. By providing the ends of the tensioning band with eyelets through which pins or bolts extend that connect the ends of the tensioning band with the hand lever and with the lug, respectively, a very firm connection is established which permits the exertion of high tension forces upon the slotted sleeve.

It is particularly advantageous if the tensioning band is of two parts which can be shifted lengthwise relative to one another and arrested in various positions, in order to change the effective circumferential length of the tensioning band. An adjusting screw may be employed for the purpose of displacing the two parts relative to one another, analogous to the manner in which such an adjusting screw operates on a hose clamp.

If the slotted sleeve is provided with a plurality of circumferentially spaced axial slots, an exact centering of the sleeve and the auxiliary tool unit with reference to the spindle neck of the power drill can be obtained in advantageous manner in that the slotted sleeve accommodates at least one intermediate ring insert which is provided with a circumferential interruption and which overlies at least some of the slots in the slotted sleeve. The circumferential interruption of the ring insert advantageously faces towards the manually operable means in order to obtain an optimum tensioning effect.

The novel features which are considered as characteristic for the invention are set forth in particular in the appended claims. The invention itself, however, both as to its construction and its method of operation, together

DESCRIPTION OF THE PREFERRED EMBODIMENTS

Figure 1:
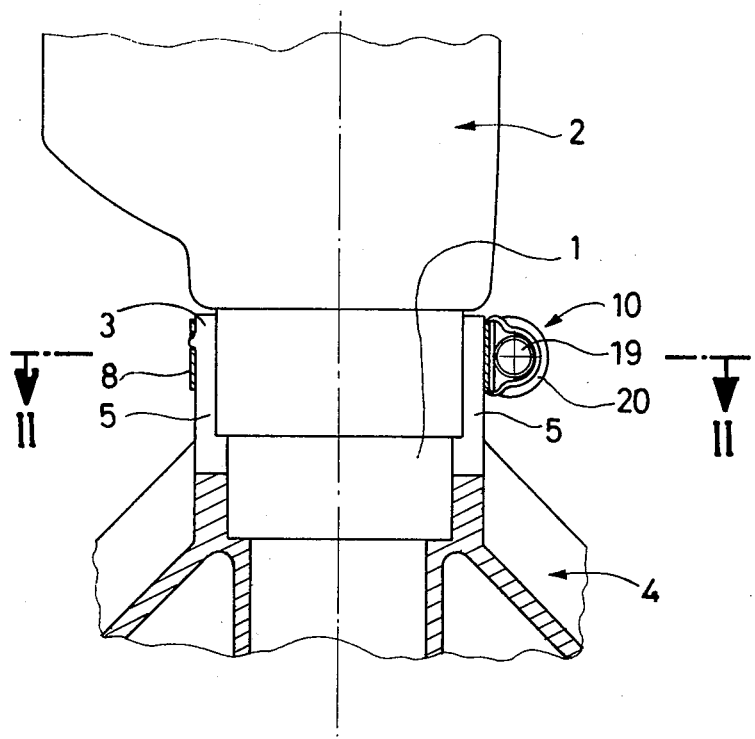
FIG. 1 is a fragmentary axial section showing a device according to the present invention connecting the spindle neck of a power drill with the slotted sleeve of an auxiliary tool unit.
Figure 2:
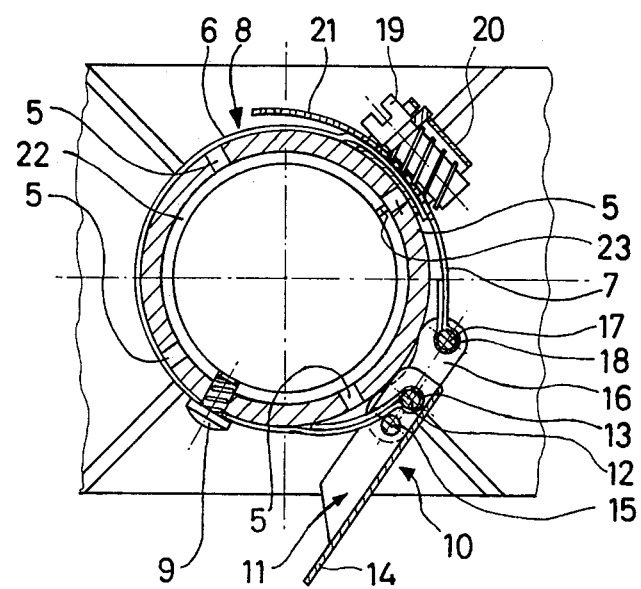
FIG. 2 is a section taken on line II—II of FIG. 1.

FIGS. 1 and 2 show a single exemplary embodiment of the invention. Reference numeral 1 identifies diagrammatically the spindle neck of a manually held fragmentarily shown power drill which is to power an auxiliary tool unit 4. The latter has a housing that is only fragmentarily shown and is provided with an axially slotted sleeve 3, in the illustrated embodiment of synthetic plastic material. The axial slots in the sleeve 3 are identified with reference numeral 5. The sleeve 3 is surrounded, adjacent one end thereof, by a tensioning band 8 which is composed of two band portions 6 and 7 that are separate from one another and which can be shifted lengthwise of one another in order to change the effective length of the band 8. A retaining screw 9 extends through a hole in the band 8 and retains the same against shifting relative to the slotted sleeve 3.

A manually operable arrangement 10 is provided which serves to tighten or release the band 8 about the slotted sleeve 3, thus drawing the same into firm frictional contact with the spindle neck 1 of the drill 2 when the band 8 is tightened. According to the invention, the operation of the manually operable device 10 is purely manual and no tools whatsoever are required for it.

As FIG. 2 shows most clearly, the device 10 has a lever 1 which can be engaged at its end portion 14 by the fingers of a user, whereas its other end is articulated to an end of the band portion 16 via a bolt or pin 12 extending through an eyelet 13 in the band portion 6 and connected with the end of the lever 11. Intermediate the pin 10 and the end portion 14 serving as the handle of the lever there are provided two lugs 16 which are located at opposite sides of the lever 11, one lug being located below and one above the lever 11 as seen in FIG. 2 (only the lower lug is shown). The two lugs 16 are secured to the lever 11 by means of a bolt or pin 15, and a further bolt or pin 17 extends through an eyelet 18 in an end portion of the strip part 7 to establish an articulate connection between the latter and the lever 11, or rather the lugs 16. In order to decrease the forces transmitted to the slotted sleeve 3 and prevent damage to the latter the sides of the lugs 16 which face the outer circumferential surface of the sleeve 3 may be curved in accordance with the circumferential curvature of the sleeve 3, as shown in FIG. 2.

To change the effective length of the tensioning band 8, and thereby to adjust the tensioning force exerted by the lever 11, the band portions 6 and 7 can be shifted lengthwise of one another by the adjusting screw 19. The latter is turnably received in a bracket 20 that is rigidly connected with the band portion 6 (or which might even be unitary therewith) so that the screw 19 can be turned but cannot shift lengthwise of itself. A portion of the band portion 7 is pushed through this bracket 20 intermediate the screw 19 and the outer surface of the band portion 6; this portion of the band portion 7 is provided with elongated ribs, depressions or cutouts 21 into which the screw threads of the screw 19 extend so that, given the fact that the screw 19 cannot shift lengthwise, turning of the screw 19 in cooperation between the screw threads and the portions 21 will effect relative lengthwise movement of the band portions 6 and 7, thus either lengthening the band 8 or shortening it, depending upon the direction in which the screw 19 is turned. This arrangement makes it possible to readily vary the force which will be exerted by the band 8 upon the sleeve 3 when the lever 11 is operated, and also to compensate for manufacturing tolerances of even a very large magnitude. Once the tensioning force has been set by adjusting the effective length of the tensioning band 8, it remains the same for all further use until it is re-adjusted.

In order to assure an exact centering of the spindle neck 1 of the power drill 2 in the sleeve 3 the latter accommodates a ring insert 22 having an axial slot 23 which faces towards the screw 19 in order to obtain the minimum possible relative movements between the insert 22 and the sleeve 3 during the tensioning operation. The ring 22 may be held by the retaining screw 9 as shown in FIG. 2, in that the inner end portion of the retaining screw 9 extends into a hole in the circumference of the ring insert 22.

It will be understood that each of the elements described above, or two or more together, may also find a useful application in other types of constructions differing from the types described above.

While the invention has been illustrated and described as embodied in a device for releasably securing the spindle neck of a power drill in a slotted sleeve of an auxiliary tool unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

The term "manually held" as employed herein refers to the fact that the drill is a portable rather than a fixedly mounted one.

What is claimed as new and desired to be protected by Letters Patent is set forth in the appended claims:

1. A device for releasably securing the spindle neck of a manually held power drill with an auxiliary tool unit, comprising a manually held power drill having an auxiliary tool unit which is to be powered by the power drill and has a slotted sleeve dimensioned to surround the spindle neck thereof; tensioning means for tensioning said slotted sleeve about the spindle neck so as to frictionally connect said auxiliary tool unit to the power drill to be powered by the same, said tensioning means comprising a tensioning band surrounding said sleeve and having two end portions; and tool-lessly manually operable means for rapidly engaging and disengaging said tensioning means, comprising a hand lever having one end articulated to one of said end portions and another end adapted to be gripped by a user, and further comprising a lug connected with the other of said end portions and articulated to said lever intermediate said ends thereof, said lug having one side facing toward and another side facing away from said sleeve, at least said one side being curved in conformance with the circumferential curvature of said sleeve.

2. A device for releasably securing the spindle neck of a manually held power drill with an auxiliary tool unit, comprising a manually held power drill having an auxiliary tool unit which is to be powered by the power drill and has a sleeve dimensioned to surround the spindle neck thereof and provided with circumferentially spaced slots; a circumferentially incomplete ring-shaped centering insert for said spindle neck, received in said sleeve and overlying at least some of said slots; tensioning means for tensioning said slotted sleeve about the spindle neck so as to frictionally connect said auxiliary tool unit to the power drill to be powered by the same; and tool-lessly manually operable means for rapidly engaging and disengaging said tensioning means.

3. A device as defined in claim 2, wherein said tensioning means comprises a tensioning band surrounding said sleeve, and means for changing the effective length of said tensioning band.

4. A device as defined in claim 2, wherein the sleeve is of synthetic plastic material, and said tensioning means comprises a tensioning band surrounding said sleeve and means for changing the effective length of said tensioning band.

5. A device as defined in claim 2, wherein said tensioning means comprises a tensioning band surrounding said sleeve and having two end portions, said manually operable means comprising a hand lever having one end articulated to one of said end portions and another end adapted to be gripped by a user, and further comprising a lug connected with the other of said end portions and articulated to said lever intermediate said ends thereof.

6. A device as defined in claim 5, wherein said end portions are formed with eyelets, and further comprising pins extending through said eyelets and connecting said end portions articulately to said lever.

7. A device as defined in claim 2, wherein said tensioning means comprises a two-part tensioning band surrounding said sleeve, and means for shifting said parts lengthwise of one another and arresting them in selected overlapped positions so as to change the effective length of said tensioning band.

8. A device as defined in claim 7, wherein said means for shifting and arresting comprises an adjusting screw.

9. A device as defined in claim 8, said parts each having two spaced end portions, said adjusting screw being mounted at one of said end portions of one of said parts and extending tangentially of said tensioning band, and one of said end portions of the other part having engaging portions which cooperate with the threads of said adjusting screw.

10. A device as defined in claim 2, wherein said tensioning means comprises a tensioning band surrounding said sleeve, means for changing the effective length of said tensioning band, and a retaining screw retaining said tensioning band on said sleeve against displacement relative to the same.

11. A device as defined in claim 2, wherein said tensioning means comprises a tensioning band surrounding said sleeve, means for changing the effective length of said tensioning band, and at least one projection on said sleeve and engaging said band for retaining the same against displacement relative to said sleeve.

12. A device as defined in claim 2, said incomplete ring-shaped insert having a circumferential interruption which is located in the region of said manually operable means.

13. A device as defined in claim 12; and further comprising a retaining screw retaining said tensioning band and said ring-shaped insert against displacement relative to said sleeve.

* * * * *